(12) United States Patent
Handa (10) Patent No.: US 8,032,326 B2
(45) Date of Patent: Oct. 4, 2011

(54) MAGNETIC DATA PROCESSING DEVICE, METHOD, AND PROGRAM, AND MAGNETIC PROCESSING SYSTEM

(75) Inventor: Ibuki Handa, Iwata (JP)

(73) Assignee: Yamaha Corporation, Shizuoka-ken (JP)

( * ) Notice: Subject to any disclaimer, the term of this patent is extended or adjusted under 35 U.S.C. 154(b) by 532 days.

(21) Appl. No.: 12/040,373

(22) Filed: Feb. 29, 2008

(65) Prior Publication Data

US 2008/0215287 A1    Sep. 4, 2008

(30) Foreign Application Priority Data

Mar. 1, 2007  (JP) ................... 2007-051117

(51) Int. Cl.
*G01C 9/00* (2006.01)
*G01C 17/00* (2006.01)
*G01C 19/00* (2006.01)

(52) U.S. Cl. .................................................. 702/153

(58) Field of Classification Search ............... 702/115, 702/150–154, 158, 179, 180; 324/200, 207.11, 324/207.23, 301, 319; 33/300, 355 R
See application file for complete search history.

(56) References Cited

U.S. PATENT DOCUMENTS

| 6,882,435 | B2 * | 4/2005 | Yagi et al. ................ 356/602 |
| 7,194,816 | B2 * | 3/2007 | Tamura .................... 33/355 R |
| 7,278,219 | B2 * | 10/2007 | Honkura et al. ............. 33/356 |
| 2003/0053669 | A1 * | 3/2003 | Suri et al. ................. 382/130 |
| 2005/0256673 | A1 * | 11/2005 | Hikida et al. .............. 702/150 |
| 2006/0031014 | A1 | 2/2006 | Sato et al. |
| 2007/0086103 | A1 * | 4/2007 | Handa ...................... 360/43 |
| 2007/0213950 | A1 * | 9/2007 | Handa ...................... 702/95 |
| 2009/0171608 | A1 * | 7/2009 | Handa ...................... 702/92 |

FOREIGN PATENT DOCUMENTS

| JP | 2007113993 | 5/2007 |
| WO | WO-2006009247 | 1/2006 |

OTHER PUBLICATIONS

English translation of JP 2004-012416, Detailed Description, Jan. 15, 2004.*
English translation of JP 2004-012416, Claims, Jan. 15, 2004.*
English translation of JP 2004-012416, Abstract, Jan. 15, 2004.*
English translation of JP 09-133530, Detailed Description, May 20, 1997.*
English translation of JP 09-133530, Claims, May 20, 1997.*
English translation of JP 09-133530, Abstract, May 20, 1997.*
English translation of JP 09-081308, Detailed Description, Mar. 28, 1997.*
English translation of JP 09-081308, Claims, Mar. 28, 1997.*
English translation of JP 09-081308, Abstract, Mar. 28, 1997.*
English translation of JP 08-105745, Detailed Description, Apr. 23, 1996.*
English translation of JP 08-105745, Claims, Apr. 23, 1996.*
English translation of JP 08-105745, Abstract, Apr. 23, 1996.*

* cited by examiner

*Primary Examiner* — Michael Nghiem
(74) *Attorney, Agent, or Firm* — Dickstein Shapiro LLP (57) ABSTRACT

A magnetic data processing device sequentially receives magnetic data samples each of which is three-dimensional vector data represented by a linear combination of fundamental vectors and which are outputted from a three-dimensional magnetic sensor. The magnetic data processing device defines a statistical population which includes a plurality of the magnetic data samples sequentially inputted and which signifies a rotation of the three-dimensional magnetic sensor of a predetermined range, and operates when a distribution of the magnetic data samples of the statistical population is flat, for deducing a direction perpendicular to a plane which approximates the flat distribution of the statistical population, as vertical-direction data representing a vertical direction.

8 Claims, 4 Drawing Sheets

MAGNETIC DATA PROCESSING DEVICE, METHOD, AND PROGRAM, AND MAGNETIC PROCESSING SYSTEM

BACKGROUND OF THE INVENTION

1. Technical Field

The present invention relates to a magnetic data processing device, method, and program, and a magnetic processing system, and more particularly, to a technology for deducing an attitude and an orientation without use of an acceleration sensor.

2. Background Art

In recent years, mounting a magnetic sensor and an acceleration sensor in a mobile entity such as a personal digital assistant (PDA), a portable cellular phone, or a vehicle has prevailed. The magnetic sensor includes magnetic sensor modules for decomposing a vector of a magnetic field into mutually orthogonal components and detecting the decomposed components. Magnetic data that is an output of the magnetic sensor is a combination of the outputs of the respective magnetic sensor modules, and is vector data represented by a linear combination of mutually orthogonal fundamental vectors. The direction and magnitude of the magnetic data correspond to the direction and magnitude of the magnetic field detected by the magnetic sensor.

The acceleration sensor detects a gravitational acceleration in a static state, and can therefore detect the inclination of a mobile entity with a vertical direction as a reference. Once the direction of geomagnetism is identified with a mobile entity as a reference and the inclination of the mobile entity is identified with the vertical direction as a reference, the attitude of the mobile entity can be deduced with an azimuth as a reference. For example, Reference is made to International Patent Publication No. WO/2006-009247 Pamphlet.

However, in order to deduce the attitude of a mobile entity with an azimuth as a reference, both a magnetic sensor and an acceleration sensor are conventionally needed.

SUMMARY OF THE INVENTION

An object of the present invention is to deduce the attitude of a mobile entity on the basis of an output of a magnetic sensor without use of an output of an acceleration sensor under a specific condition.

(1) A magnetic data processing device for accomplishing the above object includes: an input part that sequentially inputs magnetic data samples each of which is three-dimensional vector data represented by a linear combination of fundamental vectors and which are outputted from a three-dimensional magnetic sensor; and a vertical direction deducing part that defines a statistical population which includes a plurality of the magnetic data samples sequentially inputted by the input part and which signifies a rotation of the three-dimensional magnetic sensor of a predetermined range, and operates when a distribution of the magnetic data samples of the statistical population is flat, for deducing a direction perpendicular to a plane which approximates the flat distribution of the statistical population, as vertical-direction data representing a vertical direction.

According to the inventive magnetic data processing device, under a condition that a mobile entity rotates with an almost vertical-direction axis as a center, the vertical direction with the attitude of the magnetic sensor as a reference can be deduced without use of an output of an acceleration sensor. The reasons will be described below. When the mobile entity in which the three-dimensional magnetic sensor is mounted rotates with a vertical-direction axis as a center, magnetic data samples outputted from the three-dimensional magnetic sensor are distributed on a plane. Consequently, when the mobile entity rotates with the vertical-direction axis as a center, the distribution of magnetic data samples outputted from the three-dimensional magnetic sensor is flat. The distribution can therefore be approximated with a plane. A direction perpendicular to the approximation plane coincides with the vertical-direction axis. Consequently, under the condition that the mobile entity rotates with the almost vertical-direction axis as a center, the magnetic data processing device can deduce the vertical direction with the attitude of the magnetic sensor as a reference without use of an output of an acceleration sensor. The condition that the mobile entity rotates with the almost vertical-direction axis as a center is met by a movement made by such a mobile entity as a ground transport machine or a marine transport machine, for example, an automobile, a train, or a ship that makes a parallel movement on an almost horizontal surface, or information equipment fixed to the transport machine such as a PDA or a notebook personal computer.

An advantage that the vertical direction can be deduced under this condition is significant for mobile entities each of which is not always used in a specific attitude, though it is held in a nearly constant attitude when used. For example, an attitude of a PDA mounted in a vehicle can be identified using the inventive magnetic data processing device. Incidentally, what is referred to as a "predetermined range" is a range determined with one or more thresholds. Moreover, the vertical-direction data may be data permitting identification of the vertical direction and represents an array signifying a matrix or an array of multiple angles.

(2) In a magnetic data processing device for accomplishing the aforesaid object, the vertical direction deducing part may deduce as the vertical-direction data the direction of an eigenvector corresponding to a minimum principal value of the distribution of the statistical population of the magnetic data sample.

Eigenvalues of a distribution can be deduced relatively efficiently by a computer. Therefore, the vertical direction can be efficiently deduced.

(3) In a magnetic data processing device for accomplishing the aforesaid object, assuming that the statistical population is $q_i^T=(q_{ix},q_{iy},q_{iz})$ (where i denotes 0, 1, 2, etc. ..., N−1) and a vector Q is a centroid of magnetic data samples $q_i$, the vertical direction deducing part preferably deduces as the vertical-direction data the direction of an eigenvector corresponding to a minimum eigenvalue of a matrix B defined by an equation (1) below.

$$B = \sum_{i=0}^{N-1} (q_i - Q)(q_i - Q)^T \quad (1)$$

In the present specification, vectors shall be all column vectors, and row vectors shall be expressed as a transposed matrix of column vectors.

(4) In a magnetic data processing device for accomplishing the aforesaid object, when $\lambda_3/\lambda_1 < r$ (where r denotes a constant) is satisfied relative to a maximum eigenvalue $\lambda_1$ of the matrix B and a minimum eigenvalue $\lambda_3$ thereof, the vertical direction deducing part may deduce as the vertical-direction data the direction of an eigenvector corresponding to the minimum eigenvalue $\lambda_3$.

In this case, only when λ3/λ1 that indicates a degree of flatness of the distribution of the magnetic data samples is a somewhat small value close to 0, that is, only when a deflection of an axis of rotation of a mobile entity is small, vertical-direction data can be deduced. Therefore, the precision in estimation of the vertical direction improves.

(5) In a magnetic data processing device for accomplishing the aforesaid object, when λ1>s (where s denotes a constant) is satisfied relative to the maximum eigenvalue λ1 of the matrix B, the vertical direction deducing part may deduce as the vertical-direction data the direction of an eigenvector corresponding to the minimum eigenvalue λ3.

In this case, only when the distribution of the magnetic data samples has some width, that is, only when an angle of rotation of a magnetic sensor is somewhat large, vertical-direction data can be deduced. Therefore, the precision in estimation of the vertical direction improves.

(6) In a magnetic data processing device for accomplishing the aforesaid object, an attitude deducing part may be further included for deducing three-dimensional attitude data, which represents the attitude of the three-dimensional magnetic sensor with an azimuth as a reference, on the basis of the magnetic data samples and the vertical-direction data.

In this case, a three-dimensional attitude of the mobile entity in which the magnetic sensor is mounted, can be deduced with the azimuth as a reference.

(7) In a magnetic data processing device for accomplishing the aforesaid object, an orientation deducing part may be further included for deducing one-dimensional orientation data, which is used to indicate an orientation on a display screen, on the basis of the attitude data.

In many situations, a user can intuitively and more easily understand an orientation when the orientation is displayed as one-dimensional information on a display screen than when the orientation is displayed as three-dimensional information. In this case, orientation data can be deduced, permitting the orientation to be displayed on the screen so that the orientation can be intuitively and more easily recognized in such situations.

(8) A magnetic processing system for accomplishing the aforesaid object comprises the magnetic data processing device as set forth in any of (1) to (7) and the three-dimensional magnetic sensor.

According to the magnetic processing system, under a condition that a mobile entity rotates with an almost vertical-direction axis as a center, a vertical direction can be detected without use of an output of an acceleration sensor.

(9) A magnetic data processing method for accomplishing the aforesaid object includes: sequentially inputting magnetic data samples each of which is three-dimensional vector data represented by a linear combination of fundamental vectors and which are outputted from a three-dimensional magnetic sensor; defining a statistical population which includes a plurality of the magnetic data samples sequentially inputted and which signifies a rotation of the three-dimensional magnetic sensor of a predetermined range, and when a distribution of the magnetic data samples of the statistical population is flat, deducing a direction perpendicular to a plane which approximates the flat distribution of the statistical population, as vertical-direction data representing a vertical direction.

According to the magnetic data processing method, under a condition that a mobile entity rotates with an almost vertical-direction axis as a center, the vertical direction can be deduced without use of an output of an acceleration sensor.

(10) A machine readable medium is provided for use in a computer, the medium containing a magnetic data processing program executable by the computer to perform a process of: sequentially inputting magnetic data samples each of which is three-dimensional vector data represented by a linear combination of fundamental vectors and which are outputted from a three-dimensional magnetic sensor; defining a statistical population which includes a plurality of the magnetic data samples sequentially inputted and which signifies a rotation of the three-dimensional magnetic sensor of a predetermined range, and when a distribution of the magnetic data samples of the statistical population is flat, deducing a direction perpendicular to a plane which approximates the flat distribution of the statistical population, as vertical-direction data representing a vertical direction.

When the magnetic data processing program is run in a computer, under a condition that a mobile entity is rotated with an almost vertical-direction axis as a center, a vertical direction can be deduced without use of an output of an acceleration sensor.

DETAILED DESCRIPTION OF THE INVENTION

An embodiment of the present invention will be described in a sequence described below on the assumption that a PDA is functioned as an electronic compass while being attached to a transport machine such as a vehicle.

Figure 1:
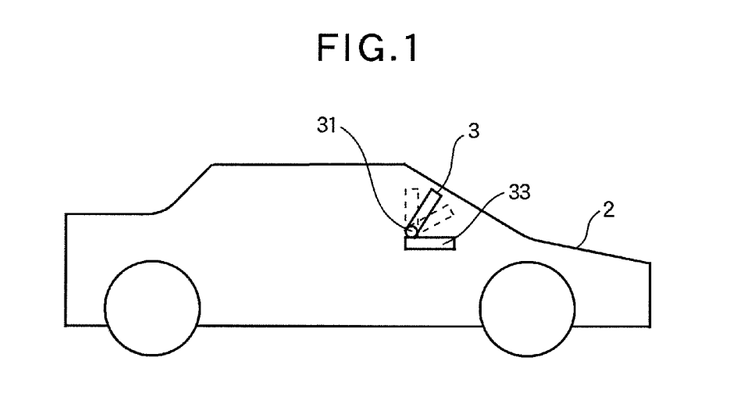
FIG. 1 is an illustrative diagram concerning an embodiment of the present invention.

[1. Overview]
1-1. Description of principles
1-2. Hardware configuration
1-3. Software configuration
[2. Processing flow]
[3. Other embodiments]
1. Overview
1-1. Description of Principles A support base 33 having a hinge 31 as shown in FIG. 1 is fixed to a dashboard or the like of an automobile 2. When a PDA 3 is secured to the automobile 2 via the base 33, a driver can arbitrarily adjust an angle of attachment of the PDA 3 so that the driver can easily view the display screen of the PDA 3. For example, an angle formed by the screen and a horizontal plane may be adjusted, or the screen may be rotated with a vertical axis as a center so that a line of vision will be parallel to a perpendicular to the screen. Thus, the screen of the PDA 3 can be adjusted so that it can be easily seen. In the present embodiment, a magnetic processing system that deduces one-dimensional orientation data for use in indicating an orientation on the screen of the PDA 3 in such a situation will be described.

Figure 2:
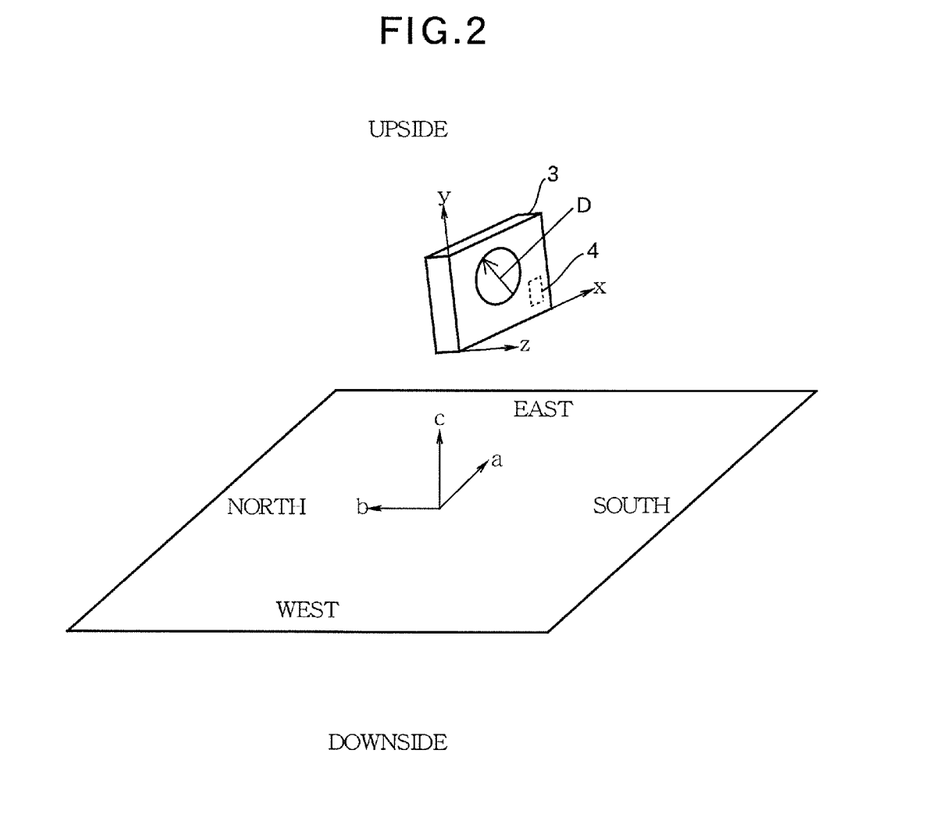
FIG. 2 is an illustrative diagram concerning the embodiment of the present invention.

FIG. 2 is an illustrative diagram showing a coordinate system employed in the present embodiment.

Since a magnetic sensor 4 incorporated in the PDA 3 makes a motion as an integral part of the PDA 3, the motions or attitudes of the magnetic sensor 4 and PDA 3 can be uniquely expressed in the same coordinate system. The attitudes of the PDA 3 and magnetic sensor 4 shall be expressed in the coordinate system having as bases a vertically upward vector c, a horizontally north-oriented vector b, and a horizontally east-oriented vector a. The vectors a, b, and c are defined as equations (2) below so that the vectors will be regarded as standard bases.

$$a = \begin{bmatrix} 1 \\ 0 \\ 0 \end{bmatrix}, b = \begin{bmatrix} 0 \\ 1 \\ 0 \end{bmatrix}, c = \begin{bmatrix} 0 \\ 0 \\ 1 \end{bmatrix} \quad (2)$$

When vectors x, y, and z whose magnitudes are 1 and whose orientations are the directions of three respective reference axes x, y, and z that are mutually orthogonal and settled in the PDA 3 are expressed as linear combinations of the standard bases {a, b, c}, it is equivalent to expressing of the attitude of the PDA 3. The vectors x, y, and z are expressed as the linear combinations of the reference bases {a, b, c} using coefficients xa, xb, xc, ya, yb, yc, za, zb, and zc as provided by equations (3), (4), and (5) below. As for the vectors x, y, and z, the direction of the vector y shall coincide with the direction from below the screen of the PDA 3 to above, and the direction of the vector z shall coincide with the direction from the back of the screen of the PDA 3 to the front thereof.

$$x = x_a a + x_b b + x_c c \quad (3)$$

$$y = y_a a + y_b b + y_c c \quad (4)$$

$$z = z_a a + z_b b + z_c c \quad (5)$$

The relationship among the equations (3), (4), and (5) can be rewritten as expressed by an equation (6) below.

$$\begin{bmatrix} x & y & z \end{bmatrix} = \begin{bmatrix} a & b & c \end{bmatrix} \begin{bmatrix} x_a & y_a & z_a \\ x_b & y_b & z_b \\ x_c & y_c & z_c \end{bmatrix} \quad (6)$$

Since the standard bases are defined as expressed by the equations (2), the equation (6) can be transformed into an equation (7) below.

$$\begin{bmatrix} x & y & z \end{bmatrix} = \begin{bmatrix} x_a & y_a & z_a \\ x_b & y_b & z_b \\ x_c & y_c & z_c \end{bmatrix} \quad (7)$$

A matrix A of an equation (8) expressing the vectors x, y, and z as one matrix shall be called an attitude matrix. The matrix A is an orthogonal matrix. Although the determinant of the orthogonal matrix is generally 1 or −1, a reference axis is designated in the PDA 3 in the present embodiment so that the determinant of the matrix A will be 1. The thus defined proper orthogonal matrix A is associated with the attitude of the PDA 3 on a one-to-one correspondence basis.

$$A = [x \ y \ z] \quad (8)$$

A three-dimensional vector that is oriented to the north and represented by magnetic data outputted from the magnetic sensor 4 shall be defined as H, and a three-dimensional vector that is oriented vertically downward shall be defined as G. H and G denote vector data expressed in the coordinate system settled in the PDA 3. H denotes magnetic data itself, and G denotes vertical-direction data itself to be described later.

When G×H≠0 (a symbol × denotes a cross product) is established, the attitude matrix A can be deduced. When G and H are parallel to each other, G×H=0 is established. However, G and H almost never become parallel to each other.

When a vector F meeting F=G×H is defined, the vector F is oriented horizontally to the east in the coordinate system settled in the PDA 3. This is because a direction perpendicular to both a north direction and a vertically upward direction is the direction of the east or west indicated on a horizontal plane. In the present embodiment, the vector F is oriented horizontally to the east due to the reference axes x, y, and z and the order of the components of the cross product defining the vector F. However, the vector F may be oriented horizontally to the west depending on the definitions of the reference axes x, y, and z, and the order of the components of the cross product defining the vector F.

Moreover, when a vector K meeting K=F×G is defined, the vector K is oriented horizontally to the north in the coordinate system settled in the PDA 3. This is because a direction perpendicular to both a horizontally east direction and a vertical direction is the direction of the south or north. Incidentally, in the present embodiment, the vector K is oriented horizontally to the north due to the definitions of the reference axes x, y, and z, and the order of the components of the cross product defining the vector K. However, the vector K may be oriented horizontally to the south depending on the definitions of the reference axes x, y, and z, and the order of the components of the cross product defining the vector K.

At this time, a matrix of an equation (9) below having F, K, and −G normalized to have a magnitude of 1 and lined as a column vector is a matrix produced by performing some rotating operation on the attitude matrix A. In particular, when the bases of H and G are oriented in the directions of the reference axes x, y, and z, the matrix of the equation (9) is the attitude matrix A itself.

$$\begin{bmatrix} F^T / \|F\| \\ K^T / \|K\| \\ -G^T / \|G\| \end{bmatrix} \quad (9)$$

Therefore, a three-dimensional attitude of the PDA 3 with an azimuth as a reference can be deduced based on magnetic data samples outputted from the magnetic sensor 4 and the vertical-direction data representing a vertical upward orientation.

Next, the principle of the deduction of vertical-direction data, which represents a vertical direction, from magnetic data samples will be described below.

A motion of a ground transport machine such as the automobile 2 or a marine transport machine is made on a nearly horizontal plane. When the automobile 2 whirls, the PDA 3 makes a rotational motion with a nearly vertical axis as a center together with the automobile 2. When the automobile 2 whirls on a slope, the axis of rotation deviates from the vertical axis. Even in this case, in the present embodiment, an error in deduction of the vertical direction caused by the deviation is negligible.

Figure 3:
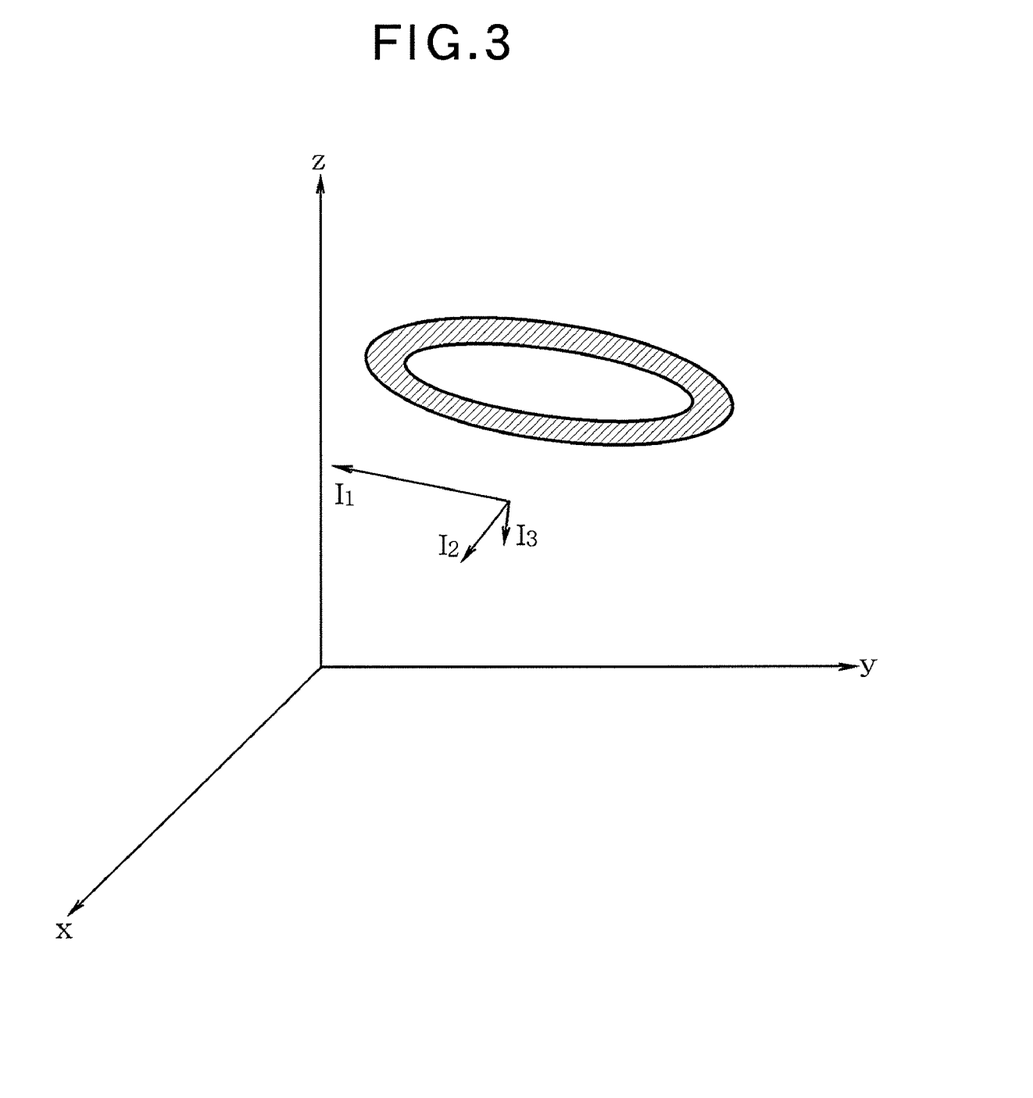
FIG. 3 is an illustrative diagram concerning the embodiment of the present invention.

In a period during which the automobile 2 whirls 360°, when magnetic data samples sequentially outputted from the magnetic sensor 4 at discrete time instants are plotted in the coordinate system settled in the PDA 3 (which is also a coordinate system settled in the magnetic sensor 4), the magnetic data samples are distributed in a doughnut-shaped domain indicated with a hatched area in FIG. 3. As mentioned previously, since the automobile 2 makes a motion on a nearly horizontal plane, the deflection of the axis of rotation is limited. Consequently, the distribution of magnetic data samples is flat and can therefore be approximated to a plane. A vertical-direction axis in the coordinate system settled in the PDA 3 nearly coincides with a direction perpendicular to the approximation plane. Consequently, when the automobile 2 is making a rotational motion, the vertical direction can be inferred in the coordinate system settled in the PDA 3 on the basis of the magnetic data samples. In the present embodiment, one of the principal values of the distribution of magnetic data samples is used to deduce the direction perpendicular to the approximation plane.

1-2. Hardware Configuration

Figure 4:
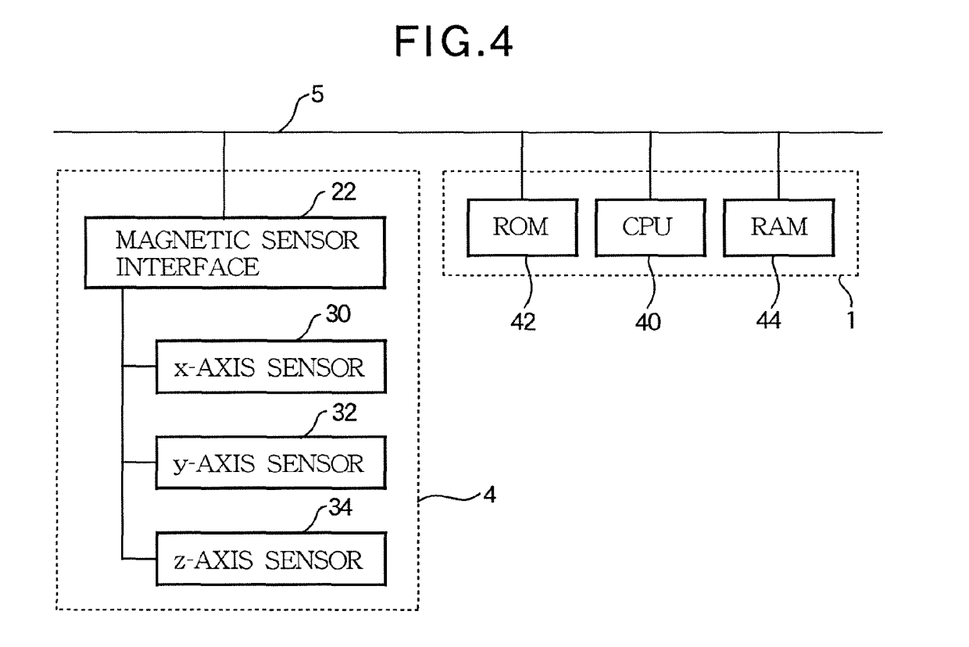
FIG. 4 is a block diagram concerning the embodiment of the present invention.

FIG. 4 is a block diagram showing a magnetic processing system including the magnetic sensor 4 and a magnetic data processing device 1. The magnetic sensor 4 includes an x-axis sensor 30, a y-axis sensor 32, and a z-axis sensor 34 that detect an x-direction component, a y-direction component, and a z-direction component, respectively, of a magnetic field vector representing geomagnetism. The x-axis sensor 30, y-axis sensor 32, and z-axis sensor 34 are formed of magneto-resistance elements, Hall elements, or magneto-impedance (MI) elements, and may be any sensors as long as they are one-dimensional magnetic sensors having directivity. The axes of sensitivity of the x-axis sensor 30, y-axis sensor 32, and z-axis sensor 34 are fixed to be mutually orthogonal. The outputs of the x-axis sensor 30, y-axis sensor 32, and z-axis sensor 34 are inputted to a magnetic sensor interface (I/F) 22 in a time-sharing manner. In the magnetic sensor interface 22, after the inputs from the x-axis sensor 30, y-axis sensor 32, and z-axis sensor 34 are amplified, they are analog-to-digital (A/D) converted. Digital magnetic data outputted from the magnetic sensor interface 22 is inputted to the magnetic data processing device 1 over a bus 5.

The magnetic data processing device 1 is a so-called computer including a CPU 40, a ROM 42, and a RAM 44. The CPU 40 is a main processor that is, for example, in charge of overall control of the PDA 3. The ROM 42 is a non-volatile and machine-readable storage medium in which a magnetic data processing program to be executed by the CPU 40 and various programs needed to realize the functions of the PDA 3 are stored. The RAM 44 is a volatile storage medium in which data to be processed by the CPU 40 is temporarily held. Incidentally, the magnetic data processing device 1 and the magnetic sensor 4 may be constructed as a one-chip magnetic processing system.

1-3 Software Configuration

Figure 5:
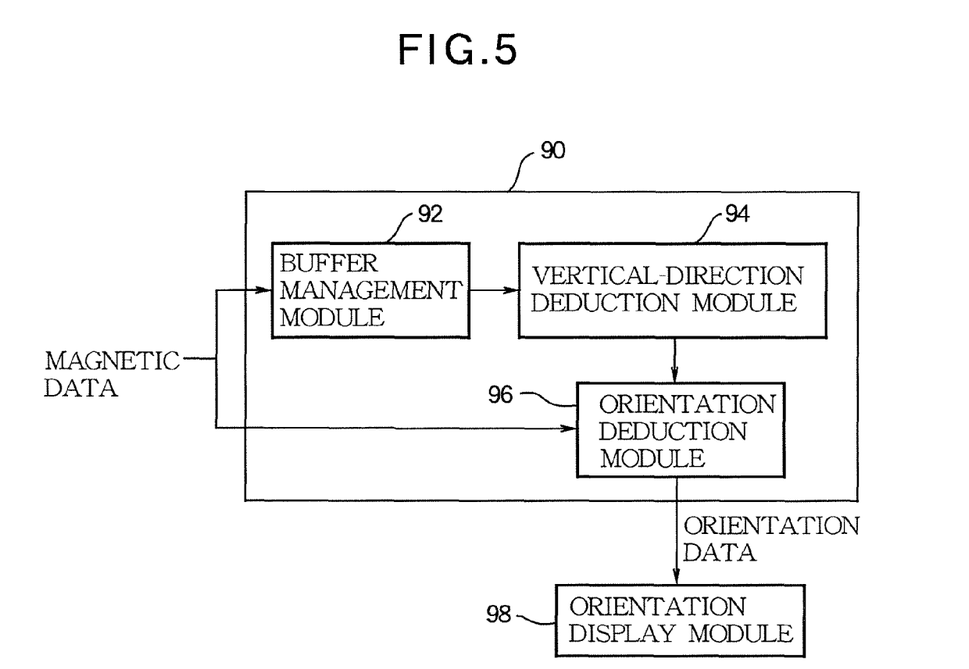
FIG. 5 is a block diagram concerning a first embodiment of the present invention.

FIG. 5 is a block diagram showing the configuration of a magnetic data processing program 90. The magnetic data processing program 90 is a program for providing an orientation display module 98 with orientation data, and is stored in the ROM 42. The orientation data is one-dimensional data for use in indicating a north azimuth on a display screen in an easy-to-see manner. The magnetic data processing program 90 includes a group of modules such as a buffer management module 92, a vertical-direction deduction module 94, and an orientation deduction module 96.

The buffer management module 92 is a program part that inputs magnetic data from the magnetic sensor 4 at intervals of a certain time, and that stores the inputted magnetic data samples in a buffer in a FIFO manner, and allows the CPU 40, RAM 44, and ROM 42 to function as an input part. A group of magnetic data samples stored in the buffer shall be regarded as a statistical population data group. The statistical population data group is composed of N magnetic data samples that are inputted from the magnetic sensor 4 to the magnetic data processing device 1 at intervals of a certain time and that are stored in the buffer as represented by q0, q1, etc., and qN−1.

The vertical-direction deduction module 94 is a program part that detects a rotation of the PDA 3 on the basis of the statistical population data group held by the buffer management module 92, and that, when having detected the rotation, deduces the aforesaid vertical-direction data G, which represents a vertical direction, on the basis of the statistical population data group. The vertical-direction deduction module 94 allows the CPU 40, RAM 44, and ROM 42 to function as a vertical direction deducing part.

The orientation deduction module 96 is a program part that produces orientation data on the basis of magnetic data samples sequentially inputted from the magnetic sensor 4 and the vertical-direction data G held by the vertical-direction deduction module 94, and allows the CPU 40, RAM 44, and ROM 42 to function as an attitude deducing part and an orientation deducing part.

The orientation display module 98 displays one-dimensional information, which represents a north azimuth, on the display screen of the PDA 3 on the basis of the orientation data. Incidentally, the orientation data may be used only to display an orientation on the screen in the form of characters or an arrow or may be used to perform heading-up processing on a map displayed on the screen.

2. Processing Flow

Figure 6:
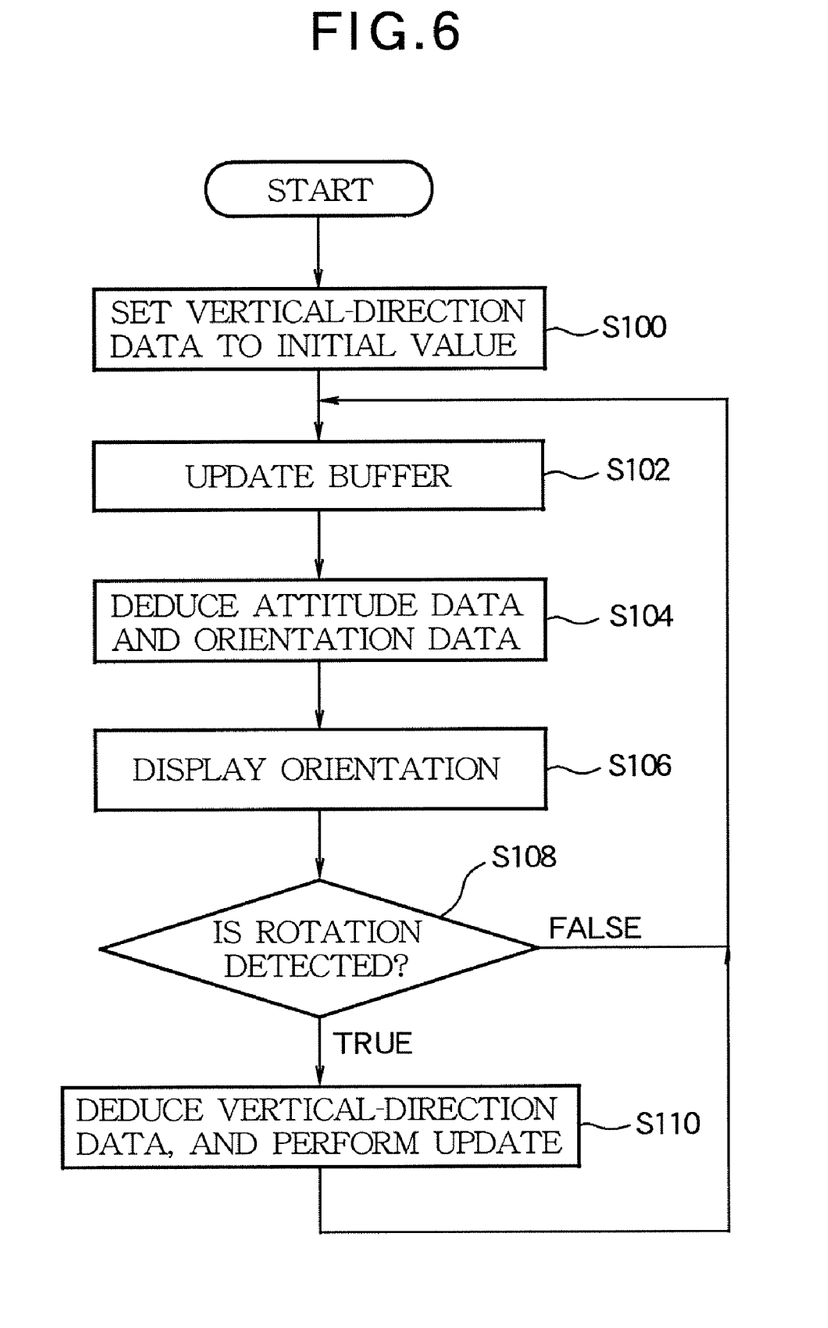
FIG. 6 is a flowchart concerning the first embodiment of the present invention.

FIG. 6 is a flowchart presenting a processing flow for displaying an orientation on the screen of the PDA 3. The processing presented in FIG. 6 proceeds when an electronic compass function is invoked in the PDA 3 and the CPU 40 runs the buffer management module 92, vertical-direction deduction module 94, orientation deduction module 96, and orientation display module 98.

At step S100, vertical-direction data held by the vertical-direction deduction module 94 is reset to an initial value. The initial value is, for example, a vector −y (the definition of a vector y is as mentioned previously). At this time, all magnetic data samples stored in the buffer where a statistical population data group is stored are deleted.

At step S102, magnetic data is inputted and stored in the buffer. If magnetic data is sequentially inputted from the magnetic sensor 4 at intervals of a too short time, the distribution of magnetic data samples to be stored in the buffer whose capacity is limited gets narrowed. Consequently, unless the automobile 2 whirls abruptly, a rotation would not be detected. Therefore, a time interval for update of the buffer (that is, a time interval for input of magnetic data) has to be properly designated.

At step S104, orientation data is deduced by the orientation deduction module 96. Specifically, the components of the aforesaid attitude matrix A are deduced as attitude data on the basis of the vertical-direction data G held by the vertical-direction deduction module 94 and magnetic data samples, and the orientation data is deduced from the attitude matrix A.

The degree of freedom of the attitude of the PDA 3 is three, since the PDA 3 makes a three-dimensional motion together with the automobile 2. Although the number of components of the attitude matrix A having three rows and three columns is 9, since the attitude matrix A is an orthogonal matrix, the degree of freedom of the attitude matrix A is also 3. For intuitively easier recognition of an orientation, displaying an orientation as one-dimensional information would be helpful. For example, when an orientation may be indicated with the magnitude of an angle or the characters of the east, west, south, and north on four respective sides of the screen, the orientation can be displayed in an intuitively discernible manner. If mapping of information whose degree of freedom is 3 to one-dimensional information is defined, one-dimensional orientation data could be deduced from the attitude matrix A. Specifically, as long as a single-valued function f(A) is defined for an arbitrary attitude matrix A, one-dimensional orientation data can be deduced from the arbitrary attitude matrix A. The single-valued function f(A) will be described below.

As described above, in the present embodiment, as for the vectors x, y, and z expressed using the vectors a, b, and c as bases, the direction of the vector y is supposed to coincide with the direction from below the screen to above, and the direction of the vector z is supposed to coincide with the direction from the back of the screen to the front thereof. At this time, when an angle formed by the vector y and a horizontal plane is much smaller than 90°, orientation data for use in indicating an orientation projected on the horizontal plane is deduced. When the angle formed by the vector y and horizontal plane is close to 90°, orientation data for use in indicating an orientation of the vector −z projected on the horizontal plane is deduced. Thus, since an orientation is indicated based on the deduced orientation data, a viewer can intuitively discern the orientation.

Assuming that the components in i rows and j columns of the attitude matrix A are aij, the magnitudes of aij correlate to an angle formed by the screen of the PDA 3 and the horizontal plane. Consequently, when an equation (10) below is established for a threshold t, the screen of the PDA 3 is thought to be nearly horizontal. The t value is, for example, $\frac{1}{2}^{1/2}$.

$$|a_{32}| \leq t \tag{10}$$

At this time, since a projection of the vector y on the horizontal plane is expressed by an equation (11) below, one-dimensional orientation data can be deduced by applying the ratio of two values $a_{12}$ and $a_{22}$ to an inverse tangent fuction.

$$[a_{12} a_{22} 0]^T \tag{11}$$

When an equation (12) below is established for the threshold t, the screen of the PDA is thought to be nearly perpendicular.

$$|a_{32}| > t \tag{12}$$

At this time, since a projection of the vector −z on the horizontal plane is expressed as an equation (13) below, one-dimensional orientation data can be deduced by applying the ratio of two values $-a_{13}$ and $-a_{23}$ to an inverter tangent function.

$$[-a_{13} -a_{23} 0]^T \tag{13}$$

Even when a calculation technique is switched from one to another with the threshold t as a border, orientation display free from discomfort can be achieved based on orientation data deduced with the aforesaid single-valued function f(A). Moreover, since the transformation method from the attitude matrix A to orientation data has no singular point, program codes can be shortened.

At step S106, an orientation is displayed on the screen of the PDA 3 on the basis of orientation data by the orientation display module 98. Specifically, for example, as shown in FIG. 2, an arrow D is displayed on the screen of the PDA 3.

At step S108, whether the PDA 3 has made a rotational motion within a predetermined range is decided based on the statistical population data group, which is stored in the buffer, by the vertical-direction deduction module 94. Specifically, a decision is made as described below.

To begin with, a matrix B defined by an equation (14) below is conceived. A 1/N of the matrix B is a variance covariance matrix of a statistical population data group qi. Herein, Q is defined by an equation (15) below and is equivalent to a centroid of qi.

$$B = \sum_{i=0}^{N-1} (q_i - Q)(q_i - Q)^T \tag{14}$$

$$Q = \frac{1}{N} \sum_{i=0}^{N-1} q_i \tag{15}$$

The executional turn of step S108 is not limited to the one presented in FIG. 6. Since the matrix B can be used to perform offset calculation for the magnetic sensor 4, if a vertical direction is deduced simultaneously with calibration of the magnetic sensor 4, calculation efficiency would improve.

Assuming that a maximum eigenvalue of the matrix B is $\lambda 1$, a minimum eigenvalue is $\lambda 3$, and the ratio thereof is $\lambda 3/\lambda 1$, when the ratio is smaller than r (that is, close to 0) and $\lambda 1$ is larger than a specific threshold s, the PDA 3 can be recognized as having rotated by a predetermined angle or more. When a deflection of the axis of rotation of the PDA 3 is small, r is a somewhat small value, and the distribution of the statistical population data group is as flat as being approximated to a plane. Incidentally, when the threshold s is an appropriately large value, if $\lambda 1$ is larger than an properly designated s, the distribution of the statistical population data group is not presumed to be linear. Moreover, as mentioned above, when the PDA 3 rotates together with the automobile 2, the distribution of the statistical population data group becomes planar. Specifically, when $\lambda 1$ is larger than s, $\lambda 2$ naturally gets somewhat large, and the statistical population data group does not exhibit a linear distribution but exhibits a planar and somewhat wide distribution.

Consequently, at step S108, the components of the matrix B are deduced, the maximum eigenvalue $\lambda 1$ and minimum eigenvalue $\lambda 3$ of the matrix B are deduced, and calculations of $\lambda 3/\lambda 1 - r$ and $\lambda 1 - s$ are executed. As a result, if the PDA 3 is recognized as having rotated by a predetermined angle or more, control is passed to processing of step S110. Otherwise, control is passed to processing of step S102.

At step S110, the direction perpendicular to an approximation plane representing the distribution of the statistical population data group is deduced as vertical-direction data, which represents a vertical direction, by the vertical-direction deduction module 94. In the present embodiment, one of the principal values of the distribution of the statistical population data group is used to deduce the direction perpendicular to the approximation plane of the distribution. More particularly, an eigenvector $l_3$ of the matrix B corresponding to the above $\lambda 3$ is deduced as vertical-direction data. This is because the direction of the eigenvector $l_3$ corresponding to the minimum eigenvalue of the matrix B is parallel to the direction perpendicular to the approximation plane of the distribution. Incidentally, assuming that the eigenvector $l_3$ is an eigenvector corresponding to $\lambda 3$, a vector $-l_3$ is also an eigenvector corresponding to $\lambda 3$, and both the directions are parallel to a vertical axis. Since a range of attitudes the PDA 3 may assume is restricted by a form in which the PDA 3 is attached to the automobile 2, either of the vectors $l_3$ and $-l_3$ can be identified as vertical-direction data representing a vertically downward orientation. For example, when a constant vector Gc is designated, if a condition that the vertical-direction data G should always satisfy an equation (16) below is imposed, G can be set to either of G=$I_3$ and G=$-I_3$.

$$G^T Gc > 0 \qquad (16)$$

As described so far, according to the present embodiment, the attitude of the PDA 3 that is a mobile entity can be deduced based on an output of the magnetic sensor 4 without use of an acceleration sensor. Consequently, according to the present embodiment, power consumption required for deduction of the attitude of the PDA 3 that is a mobile entity can be reduced as compared with the conventional one, or a calculation time required for deduction of the attitude of the PDA 3 can be shortened as compared with the conventional one. Moreover, according to the present embodiment, since one of the eigenvalues of the matrix B is used to deduce a vertical direction, an attitude and an orientation, the vertical direction, attitude and orientation can be efficiently deduced.

C. Other Embodiments

The present invention is not limited to the aforesaid embodiment but can be implemented in various manners without departure from the gist. For example, naturally, the present invention can be adapted to a magnetic processing system mounted in a notebook personal computer having a magnetic sensor incorporated in a display thereof, a portable cellular phone, or an integrated navigation apparatus whose display has the angle thereof made adjustable. Moreover, an approximation plane of a distribution of magnetic data samples may be actually deduced, and the direction of the perpendicular may be deduced as a vertical direction.

The invention claimed is:

1. A magnetic data processing device for detecting a vertical direction using a three-dimensional magnetic sensor, comprising:
an input part that sequentially inputs magnetic data samples each of which is three-dimensional vector data represented by a linear combination of fundamental vectors, the magnetic data samples being outputted from the three-dimensional magnetic sensor; and
a vertical direction deducing part that defines a statistical population, the statistical population including a plurality of the magnetic data samples sequentially inputted by the input part, the statistical population signifying a rotation of the three-dimensional magnetic sensor of a predetermined range, the vertical direction deducing part operating when a distribution of the magnetic data samples of the statistical population is flat, the vertical direction deducing part deducing vertical-direction data representing the vertical direction, the vertical direction being a direction perpendicular to a plane, the plane approximating the flat distribution of the statistical population,
wherein the vertical direction deducing part calculates a minimum principal value of the distribution of the magnetic data samples of the statistical population and deduces as the vertical-direction data a direction of an eigenvector corresponding to the minimum principal value.

2. The magnetic data processing device according to claim 1, wherein assuming that the vertical direction deducing part defines the statistical population as $q_i^T = (q_{ix}, q_{iy}, q_{iz})$ (where q denotes a magnetic data sample and i denotes 0, 1, 2, ... N−1), the vertical direction deducing part deduces as the vertical-direction data the direction of the eigenvector corresponding to a minimum eigenvalue of a matrix B defined by the following equation (1):

$$B = \sum_{i=0}^{N-1} (q_i - Q)(q_i - Q)^T \qquad (1)$$

where vector Q is a centroid of $q_i$.

3. The magnetic data processing device according to claim 2, wherein the vertical direction deducing part deduces as the vertical-direction data the direction of the eigenvector corresponding to a minimum eigenvalue $\lambda 3$, when $\lambda 3/\lambda 1 < r$ (where r denotes a constant) is satisfied relative to a maximum eigenvalue $\lambda 1$ of the matrix B and a minimum eigenvalue $\lambda 3$ thereof.

4. The magnetic data processing device according to claim 2, wherein the vertical direction deducing part deduces as the vertical-direction data the direction of the eigenvector corresponding to a minimum eigenvalue $\lambda 3$ of the matrix B, when $\lambda 1 > s$ (where s denotes a constant) is satisfied relative to a maximum eigenvalue $\lambda 1$ of the matrix B.

5. A magnetic data processing device for detecting a vertical direction using a three-dimensional magnetic sensor, comprising:
an input part that sequentially inputs magnetic data samples each of which is three-dimensional vector data represented by a linear combination of fundamental vectors, the magnetic data samples being outputted from the three-dimensional magnetic sensor; and
a vertical direction deducing part that defines a statistical population, the statistical population including a plurality of the magnetic data samples sequentially inputted by the input part, the statistical population signifying a rotation of the three-dimensional magnetic sensor of a predetermined range, the vertical direction deducing part operating when a distribution of the magnetic data samples of the statistical population is flat, the vertical direction deducing part deducing vertical-direction data representing the vertical direction, the vertical direction being a direction perpendicular to a plane, the plane approximating the flat distribution of the statistical population;
an attitude deducing part that deduces three-dimensional attitude data, which signifies an attitude of the three-dimensional magnetic sensor with reference to an azimuth on the basis of the magnetic data samples and the vertical-direction data; and
an orientation deducing part that deduces one-dimensional orientation data, which is used to indicate an orientation of a display screen, on the basis of the attitude data deduced by the attitude deducing part.

6. A magnetic processing system comprising:
a three-dimensional magnetic sensor; and
a magnetic data processing device connected to the three-dimensional magnetic sensor, wherein
the magnetic data processing device comprises:
an input part that sequentially inputs magnetic data samples each of which is three-dimensional vector data represented by a linear combination of fundamental vectors, the magnetic data samples being outputted from the three-dimensional magnetic sensor;
a vertical direction deducing part that defines a statistical population, the statistical population including a plurality of the magnetic data samples sequentially inputted by the input part, the statistical population signifying a rotation of the three-dimensional magnetic sensor of a predetermined range, the vertical direction deducing part operating when a distribution of the magnetic data samples of the statistical population is flat, the vertical direction deducing part deducing vertical-direction data representing a vertical direction, the vertical direction being a direction perpendicular to a plane, the plane approximating the flat distribution of the statistical population;

an attitude deducing part that deduces three-dimensional attitude data, which signifies an attitude of the three-dimensional magnetic sensor with reference to an azimuth on the basis of the magnetic data samples and the vertical-direction data; and an orientation deducing part that deduces one-dimensional orientation data, which is used to indicate an orientation of a display screen, on the basis of the attitude data deduced by the attitude deducing part.

7. A magnetic data processing method on a magnetic data processing device for of detecting a vertical direction using a three-dimensional magnetic sensor, comprising:

sequentially inputting magnetic data samples each of which is three-dimensional vector data represented by a linear combination of fundamental vectors, the magnetic data samples being outputted from the three-dimensional magnetic sensor;

defining a statistical population which includes a plurality of the magnetic data samples sequentially inputted, the statistical population signifying a rotation of the three-dimensional magnetic sensor of a predetermined range, when a distribution of the magnetic data samples of the statistical population is flat, deducing vertical-direction data representing the vertical direction, the vertical direction being a direction perpendicular to a plane, the plane approximating the flat distribution of the statistical population;

deducing three-dimensional attitude data, which signifies an attitude of the three-dimensional magnetic sensor with reference to an azimuth on the basis of the magnetic data samples and the vertical-direction data; and deducing, by the magnetic data processing device, one-dimensional orientation data, which is used to indicate an orientation of a display screen, on the basis of the deduced three dimensional attitude data.

8. A non-transitory computer readable medium for use in a computer, the medium containing a magnetic data processing program executable by the computer to perform a process of:

sequentially inputting magnetic data samples each of which is three-dimensional vector data represented by a linear combination of fundamental vectors, the magnetic data samples being outputted from a three-dimensional magnetic sensor;

defining a statistical population which includes a plurality of the magnetic data samples sequentially inputted, the statistical population signifying a rotation of the three-dimensional magnetic sensor of a predetermined range, when a distribution of the magnetic data samples of the statistical population is flat, deducing vertical-direction data representing a vertical direction, the vertical direction being a direction perpendicular to a plane, the plane approximating the flat distribution of the statistical population deducing three-dimensional attitude data, which signifies an attitude of the three-dimensional magnetic sensor with reference to an azimuth on the basis of the magnetic data samples and the vertical-direction data; and deducing one-dimensional orientation data, which is used to indicate an orientation of a display screen, on the basis of the deduced three dimensional attitude data.

* * * * *